| A | B | OUTPUT |
|---|---|---|
| 1 | 1 | 0 |
| 1 | 0 | 1 |
| 0 | 1 | 1 |
| 0 | 0 | 1 |

INPUT A INPUT B = NO OUTPUT

| TIME | CORE 11 | 12 | 13 | 14 | 15 | 16 |
|---|---|---|---|---|---|---|
| INITIAL | 0 | 0 | 0 | 0 | 0 | 0 |
| $t_1$ | 1 | 1 | 1 | 0 | 0 | 0 |
| $t_2$ | 0 | 0 | 1 | 1 | 0 | 0 |
| $t_3$ | 0 | 0 | 1 | 1 | 0 | 0 |
| $t_4$ | 0 | 0 | 0 | 0 | 0 | 0 |

*INVENTOR.*
SAUL B. YOCHELSON
*BY*
[signature]
ATTORNEY

| A | B | OUTPUT |
|---|---|---|
| 0 | 0 | 1 |
| 1 | 0 | 0 |
| 0 | 1 | 0 |
| 1 | 1 | 0 |

NO INPUT = OUTPUT

| TIME | CORE 11a | 12a | 13a | 14a | 15a | 16a |
|---|---|---|---|---|---|---|
| INITIAL | 0 | 0 | 0 | 0 | 0 | 0 |
| $t_1$ | 0 | 0 | 0 | 0 | 0 | 0 |
| $t_2$ | 0 | 0 | 0 | 1 | 1 | 0 |
| $t_3$ | 0 | 0 | 0 | 1 | 0 | 1 |
| $t_4$ | 0 | 0 | 0 | 0 | 0 | 0 |

INVENTOR.
SAUL B. YOCHELSON
BY
[signature]
ATTORNEY

| A | B | OUTPUT |
|---|---|---|
| 0 | 0 | 0 |
| 1 | 0 | 0 |
| 0 | 1 | 0 |
| 1 | 1 | 1 |

A INPUT  B INPUT = OUTPUT

| TIME | CORE 11b | 12b | 13b | 14b | 15b | 16b |
|---|---|---|---|---|---|---|
| INITIAL | 0 | 0 | 0 | 0 | 0 | 0 |
| $t_1$ | 1 | 1 | 1 | 0 | 0 | 0 |
| $t_2$ | 0 | 0 | 1 | 1 | 1 | 0 |
| $t_3$ | 0 | 0 | 1 | 1 | 0 | 1 |
| $t_4$ | 0 | 0 | 0 | 0 | 0 | 0 |

INVENTOR.
SAUL B. YOCHELSON
BY
[signature]
ATTORNEY 3,271,582
Patented Sept. 6, 1966

3,271,582
MAGNETIC CORE LOGIC CIRCUITS

Saul B. Yochelson, Northridge, Calif., assignor to Goodyear Aircraft Corporation, Akron, Ohio, a corporation of Delaware Filed Apr. 10, 1962, Ser. No. 186,527
8 Claims. (Cl. 307—88)

The present invention relates to magnetic core logic circuits, and, more particularly, to ferrite magnetic core logic circuits capable of performing the Boolean functions $\bar{A}+\bar{B}$, $\bar{A}\cdot\bar{B}$ and $A\cdot B$.

Magnetic core circuits capable of performing digital logic and storage have been developed in the prior art. Most of these circuits use toroidal ferrite magnetic cores having square-loop characteristics as the primary logic and storage components. These circuits contain diodes, transistors, or other semi-conductors as coupling elements between the respective cores. The diodes, transistors or other semi-conductors function to provide the circuit with the desired direction of information flow. A few magnetic core circuits have been used that have added magnetic cores and loop resistances to provide the circuit with directivity. In these circuits the added cores are allowed to switch when isolation is needed and the flux stored in them is dissipated slowly in the loop resistance. These circuits have the disadvantages of being bulky, of consuming large amounts of power, of having slow speeds, and of having logical and branching restrictions.

It is the general object of the invention to avoid and overcome the foregoing and other difficulties of the prior art practices by the provision of a simple and compact magnetic core logic circuit that is reliable and performs logical functions.

Another object of the invention is to provide a magnetic core circuit which does not have diodes or other semiconductor elements coupling the cores of the circuit.

Another object of the invention is to provide a magnetic core logic circuit which is nuclear radiation resistant and shock resistant.

Another object of the invention is to provide magnetic core circuits that can perform the logical function $A\cdot B(AND)$, $\bar{A}\cdot\bar{B}(NAND)$, and $\bar{A}+\bar{B}(NOR)$ in a four-phase time cycle.

According to the invention, the magnetic core logic circuit uses the threshold characteristics of the magnetic cores as the non-linearity needed to achieve directivity of information flow. In addition to the cores needed as information storage elements, added cores are used in place of non-linear devices found in conventional core logic circuits. Control of directivity is achieved by biasing certain cores up to their thresholds. The biasing M.M.F. applied to the cores results in the inhibiting of some cores from switching and the aiding of the switching of others. The cores of the circuit are coupled together with a conductor loop. The polarity of the conductor loop windings on the cores is such that the voltages induced into the conductor loop by switching of a core are always opposed by another switching core. The selection of the particular cores that are switched during a four-phase time cycle determines the logical operations of the circuit. Increasing the number of input coupling cores results in a majority logic circuit.

The exact nature of this invention as well as other objects and advantages thereof will be readily apparent from a consideration of the following specification relating to the annexed drawing in which.

Figures 1, 2, 3:
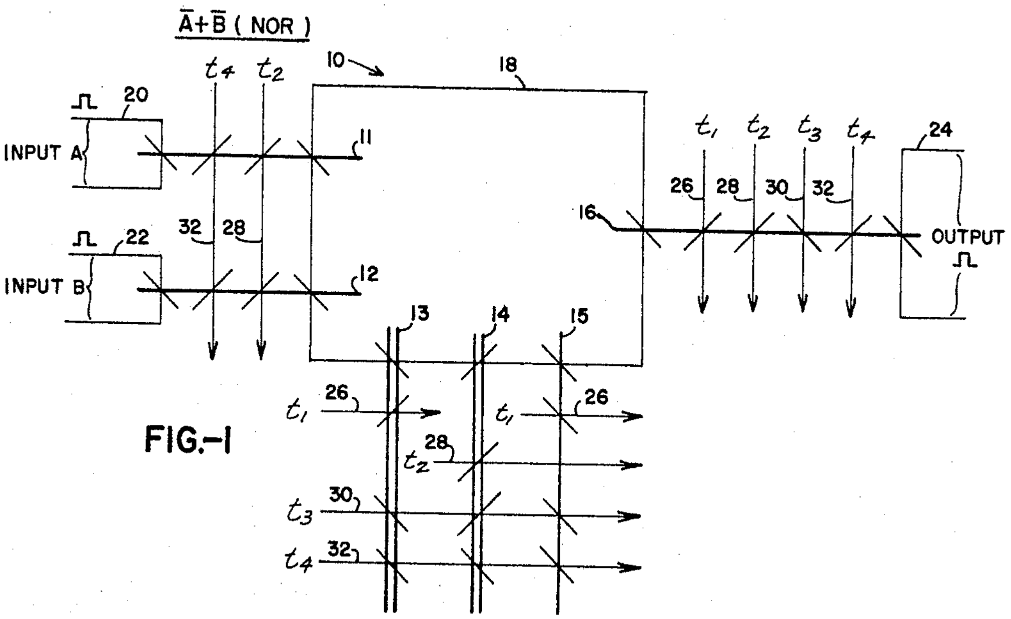
FIG. 1 is a mirror notation diagram of the magnetic circuit capable of performing the logical $\bar{A}+\bar{B}(NOR)$ function.
FIG. 2 is a truth table of the magnetic circuit of FIG. 1.
FIG. 3 is a table of the state of the cores of the magnetic circuit of FIG. 1 during the four-phase time cycle when there is an input A and an input B pulse.

Referring to the drawing, there is shown in FIG. 1 a magnetic circuit 10 capable of performing the logical $\bar{A}+\bar{B}(NOR)$ function. The main components of the circuit are ferrite magnetic cores. The magnetic material forming the cores preferably has a substantially square or rectangular hysteresis characteristic. The circuit 10 includes a first input coupling magnetic core 11 and a second input coupling magnetic core 12. The remaining cores of the circuit are a first load core 13, a second load core 14, a third load core 15, and an output coupling core 16. The input cores 11 and 12, the third load core 15, and the output coupling core 16 are substantially identical in size. The first load core 13 is larger than the first coupling core 11. Its specific size is not critical. The second load core 14 is twice the cross-sectional area of the first input core 11.

A conductor 18, which may be a low resistance wire, surrounds each core in series and forms a closed loop. The polarity of the conductor means windings on the respective cores is dependent upon the logic to be performed by the circuit.

In the magnetic circuit shown in FIG. 1 mirror notation is used to represent the core windings. A winding on the core is represented by a line crossing the core. The polarity of the winding is indicated by a diagonal line at the crossing. The diagonal lines can be thought of as mirrors which reflect the M.M.F. caused by the windings to the right or left. The direction of reflection corresponds to the direction of the resulting flux pattern. In the present case the mirror notation is used with the convention that the 1 state of a horizontally drawn core is to the right and the 1 state of a vertically drawn core is up.

An input A line 20 is coupled to core 11. An input B line 22 is coupled to the core 12. An output line 24 is coupled to core 16. The line 24 may be a conductor loop similar to the conductor loop 18.

The magnetic circuit 10 performs a logical operation in a four-phase time cycle. Separate windings for the respective times are coupled to the cores. The time $T_1$ line 26 is coupled to core 13, 15, and 16. The time $T_2$ line 28 is coupled to coupling cores 11, 12, and 16 and load cores 14 and 15. The time $T_3$ line 30 is coupled to the load cores 13, 14, 15, and 16. The time $T_4$ core line 32 is coupled to all the cores of the circuit. The polarity of the windings of the separate phase lines on the respective cores is indicated by the diagonal line at the crossing of the lines on the cores. The number of turns of the respective lines about the core is determined by the threshold characteristics of the cores. The circuit is endowed with directivity by biasing selected cores up to the cores' threshold ($H_T$).

The truth table of FIG. 2 shows the logic characteristics of the circuit 10. The circuit performs the logical $\overline{A}+\overline{B}$(*NOR*) function. The table shows that an output signal is attained when either or both input signal A and input signal B is absent. It is only when an input A signal and in input B signal are present that there will be no output.

FIG. 3 shows the changing flux states of the circuit cores when an input A and an input B are present. No output is attained. All of the cores are initially in the 0 state. At time $T_1$ the A input pulse and the B input pulse set the flux pattern of cores 11 and 12 respectively in the 1 state. At time $T_1$ the flux pattern in core 13 is set in the 1 state by the loop current flow caused by the switching of cores 11 and 12. The $T_1$ phase pulse in line 26 applies a bias on core 13 slightly less than the positive core threshold ($+H_T$) and aids its switching. The bias on cores 15 and 16 prevents them from switching. The information supplied to the circuit is in the form of a flux pattern in cores 11, 12, and 13.

At time $T_2$ the phase pulse in line 28 resets the flux pattern in cores 11 and 12 to the 0 state. The change in the flux pattern in the cores 11 and 12 induces the voltage in the loop conductor 18. This voltage will tend to switch the other cores of the circuit. A large positive drive applied to core 14 through line 28 at time $T_2$ serves to set core 14 and will set core 15 if both cores 11 and 12 were not previously set. A bias of slightly less than the positive core threshold ($+H_T$) is applied to core 15. A bias is applied to core 16 by a pulse in line 28 at $T_2$ to hold the core in the 0 state. Core 15 will not switch unless an additional M.M.F. is applied thereto in the positive direction. Since the dimensional characteristics of cores 11 and 12 equal that of core 14 the voltage induced by the cores in the conductor loop 18 are equal and opposite and thus do not result in the additional M.M.F. needed to switch core 15. However, at time $T_2$ if only one of the input coupling cores 11 or 12 switches or neither core switches, the voltage induced by the switching of core 14 is not cancelled. This voltage aided by the positive bias applied to core 15 will switch the core to the 1 state.

At time $T_3$, a phase $T_3$ pulse in line 30 biases core 13 slightly less than the negative core threshold ($-H_T$), biases core 14 slightly less than the positive core threshold ($+H_T$) and resets the flux pattern in core 15 to the 0 state, providing it was driven to the 1 state at time $T_2$. A positive bias slightly less than the positive core threshold ($+H_T$) is applied to core 16. A change in the flux pattern of core 15 coupled with the positive bias applied to core 16 will switch the flux pattern in core 16 to the 1 state at time $T_3$. A change in the flux pattern of core 16 results in an output signal in the output line 24.

At time $T_4$ a phase $T_4$ pulse in line 32 drives all the cores to reset the flux pattern therein to the 0 state. The circuit is in a condition to perform a second logical operation.

Figures 4, 5, 6:
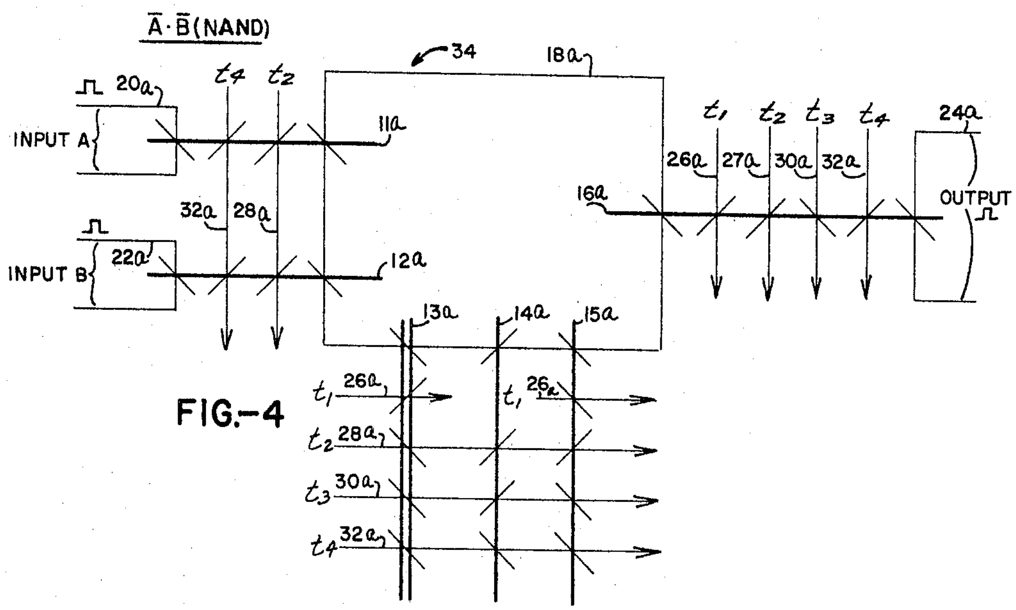
FIG. 4 is a mirror notation diagram of a magnetic circuit capable of performing the logical $\bar{A}\cdot\bar{B}(NAND)$ function.
FIG. 5 is a truth table of the magnetic circuit of FIG. 4.
FIG. 6 is a table of the state of the cores of the magnetic circuit of FIG. 4 during the four-phase time cycle when there is no input pulse.

Referring to FIG. 4 there is shown a mirror notation diagram of a magnetic circuit 34 which is capable of performing the logical $\overline{A}\cdot\overline{B}$(*NAND*) function. The circuit 34 is similar to the circuit 10 shown in FIG. 1. The similar components are identified with the same reference characters distinguished by the letter *a*. The second load core 14a of the circuit 34 has physical characteristics which are substantially equal to the physical characteristics of the first input coupling core 11a. The decrease in the size of the core 14a reduces the M.M.F. required to saturate the core with flux. In addition to the reduction in the size of the second load core 14a, a bias slightly less than the core's negative threshold ($-H_T$) is applied to the first load core 13a at times $T_2$ and $T_3$ to prevent it from switching and having an adverse effect on the circuit.

The truth diagram of FIG. 5 for the magnetic circuit 34 shows that an output is only attained when there is no input. The circuit thus performs the logical $$\overline{A}\cdot\overline{B}(NAND)$$

function.

The table of FIG. 6 shows the state of the cores of the magnetic circuit 34 during the four-phase time cycle when there are no input pulses. An output signal is attained. All of the cores are initially in the 0 state. At time $T_1$ a phase $T_1$ pulse in line 26a biases core 13a slightly under its positive threshold and biases cores 15a and 16a in the negative direction. Since the bias on core 13a does not exceed its threshold the core does not switch.

At time $T_2$, a phase $T_2$ pulse in line 28a biases core 13a in the negative direction and drives core 14a to set its flux pattern in the 1 state. The phase two pulse in line 28a also drives cores 11a and 12a to the 0 state. The flux pattern in these cores does not change because they were initially in the 0 state. The switching of the flux pattern in core 14a induces a voltage in the conductor loop 18a. This voltage coupled with the positive bias applied to core 15a switches the flux pattern in this core to the 1 state. Core 16a is held in the 0 state by a bias applied thereto.

At time $T_3$, the phase $T_3$ pulse in line 30a drives the flux pattern in core 15a to reset it to the 0 state. A positive bias is applied to cores 14a and 16a by the phase $T_3$ pulse. The bias on core 16a coupled with the voltage induced in the conductor loop 18a by the switching of core 15a switches the flux pattern in core 16a. The switching of the flux pattern in core 16a induces a voltage in the output line 24a.

At time $T_4$, the phase $T_4$ pulse in line 32a resets the flux pattern in all the cores to the 0 state.

An output signal is not attained when either or both of cores 11a and 12a switch at time $T_2$. The switching of core 11a and/or 12a at time $T_2$ induces a voltage in the conductor 18a which opposes the voltage induced in conductor 18a by the switching of the flux pattern in core 14a. Under these conditions the flux pattern of core 15a does not switch.

Figures 7, 8, 9:
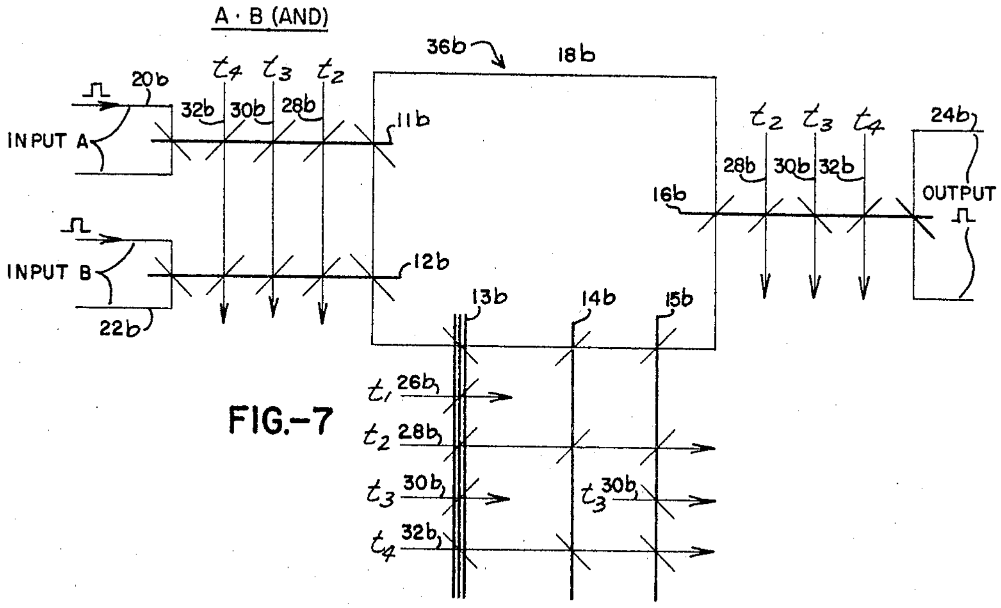
FIG. 7 is a mirror notation diagram of the magnetic circuit capable of performing the logical $A\cdot B(AND)$ function.
FIG. 8 is a truth table of the magnetic circuit of FIG. 7.
FIG. 9 is a table of the state of the cores of the magnetic circuit of FIG. 7 during the four-phase time cycle when there is an input A and an input B pulse.

Referring to FIG. 7, there is shown a mirror notation diagram of a magnetic circuit 36 capable of performing the logical $A\cdot B$(*AND*) function. Magnetic circuit 36 is substantially identical with the magnetic circuit shown in FIG. 1 and FIG. 4. The corresponding components of the circuit 36 are identified with the same reference characters distinguished by the letter *b*. The physical characteristics of load core 14b are similar to the physical characteristics of the input coupling 11b. These cores are substantially equal in size. Circuit 36 is distinguished from circuits 10 and 34 by the polarity of the conductor loop 18b windings on the load cores and the output coupling core.

The truth table of FIG. 8 shows that an output signal is attained only when an input A and an input B are present. Thus, the circuit performs the logical $$A\cdot B(AND)$$

function.

The table in FIG. 8 examines the state of the cores of the circuit 36 during the four-phase time cycle when there is an input A and an input B pulse. An output signal is attained. All of the cores are initially in the 0 state. At time $T_1$ the A input pulse in line 20 sets the flux pattern of core 11b in the 1 state. The B input pulse in line 22b sets the flux pattern in the core 12b to the 1 state. The switching of the flux patterns in the cores 11b and 12b induces a voltage in the conductor 18b. The M.M.F. resulting from this voltage tends to reset cores 14b, 15b, and 16b to the 0 state and set core 13b in the 1 state. The phase $T_1$ pulse in line 26b biases the core 13b to the 1 state. The bias applied to core 13b and the M.M.F. applied thereto by the switching of cores 11b and 12b switches core 13b to the 1 state. The flux pattern in cores 11b, 12b, and 13b are indicative of the information in the circuit.

At time $T_2$, the phase $T_2$ pulse in line 28*b* resets the flux pattern in cores 11*b* and 12*b* to the 0 state, sets the flux pattern of core 14*b* into the 1 state, applies a positive bias below the cores' threshold ($+H_T$) to cores 13*b* and 15*b*, and applies a large negative bias to core 16*b*. The bias on core 16*b* can be arbitrarily large since its function is to prevent the switching of core 16*b* from the 0 to the 1 state. The change in the flux pattern of cores 11*b* and 12*b* induces a voltage in the conductor 18*b* that is opposite to the voltage induced in the conductor 18*b* by the change in the flux pattern in core 14*b*. The voltage resulting from the change in the flux pattern of core 14*b* is not sufficient to overcome the voltage resulting from the switching of the flux pattern of the first 11*b* and second 12*b* input coupling cores. The voltage resulting from the switching of the flux pattern of the core 14*b* is only sufficient to counteract the voltage resulting from the switching of one of the input coupling cores. The positive bias applied to core 15*b* in conjunction with the M.M.F. force in conductor 18*b* caused by the switching of cores 11*b* and 12*b* switches the flux pattern in core 15*b* to the 1 state.

At time $T_3$, the phase $T_3$ pulse in line 30*b* applies a negative bias on cores 11*b* and 12*b*, a positive bias on core 13*b*, resets the flux pattern of core 15*b* to the 0 state, and applies a positive bias below the core's threshold ($+H_T$) to core 16*b*. The positive bias on core 16*b* in conjunction with the voltage induced in conductor loop 18*b* by the switching of core 15*b* switches the flux pattern in core 16*b* to the 1 state. The switching of the flux pattern in core 16*b* induces a voltage in the output line 24*b*.

At time $T_4$, the phase $T_4$ pulse in line 32*b* resets the flux pattern in all the cores to the 0 state. The circuit 36 is in a condition to perform a second logical operation.

From the description of the circuits shown in FIG. 1, FIG. 4, and FIG. 7 it is seen that no logical operations are performed at odd phase times. At the odd phase times the third load core is reset thereby transferring information into the output coupling core. The flux pattern in the output coupling core does not switch when the flux pattern in the third load core does not switch. Logic is performed at phasetime $T_2$. At this time the coupling cores are driven hard into the 0 state which results in the isolation of the loop from other loops.

While there have been shown, described, and pointed out the fundamental novel features of the invention as applied to the preferred embodiments, it will be understood that various omissions, substitutions, changes in form, and details of the circuits illustrated may be made by those skilled in the art, without departing from the spirit of the invention. It is intended to be limited only as indicated by the scope of the following claims.

What is claimed is:

1. A logic circuit comprising
a plurality of input coupling magnetic cores,
a separate input winding on each input core,
first, second, and third load cores,
an output coupling core,
an output winding on the output core,
a low resistance conductor means of equal conductivity in both directions coupling the cores in a loop,
the polarity of the conductor means windings on the cores being dependent upon the logic performed, and
means coupled to the cores to prevent partial core switching by a selective bias and to reset the flux patterns of the cores in a four phase time cycle to control the directivity of information flow.

2. A logic circuit comprising
a pair of input coupling magnetic cores,
an output coupling magnetic core,
first, second and third load cores positioned between the input cores and output core, a low resistance wire loop of equal conductivity in both directions coupling the cores,
the polarity of the loop windings on the cores being dependent upon the logic performed, and
means to prevent partial core switching by a selective bias and to reset the flux patterns of the cores in a four phase time cycle to control the directivity of information flow.

3. A magnetic circuit capable of performing logical operations comprising
a first and second input coupling magnetic core having two stable magnetic states,
an input A winding on the first input core,
an input B winding on the second input core,
an output coupling magnetic core having two stable magnetic states,
first, second and third load cores each having two stable magnetic states,
low resistance conductor means of equal conductivity in both directions connecting the individual cores to each other in a loop,
the polarity of the conductor means windings on the output core and the second and third load cores being dependent upon the logic performed, and
means coupled to all the cores to selectively hold stored flux patterns at desired levels and to reset the flux patterns of the cores in a four phase time cycle to control the directivity of information flow.

4. A magnetic core circuit capable of performing the logical $\overline{A}+\overline{B}$ function comprising
an input A and an input B coupling magnetic cores having two stable magnetic states,
said input cores having substantially the same physical dimensions,
an output coupling magnetic core having two stable magnetic states,
first, second and third load cores each having two stable magnetic states,
said second load core being substantially twice the physical size of the input A coupling core,
conductor means connecting the individual cores to each other in a loop,
the polarity of the conductor means windings on the cores being such that the circuit performs the logical $\overline{A}+\overline{B}$ function, and
means coupled to all the cores to selectively hold and reset the flux patterns of the cores in a four phase time cycle to control the directivity of information flow.

5. A magnetic core circuit capable of performing the logical $\overline{A}+\overline{B}$ function comprising
an input A and an input B coupling magnetic cores having two stable magnetic states,
said input cores having substantially the same physical dimensions,
an input A winding on the input A core,
an input B winding on the input B core,
an output coupling magnetic core having two stable magnetic states,
an output winding on the output coupling core,
first, second and third load cores each having two stable magnetic states,
said second load core being substantially twice the physical size of the input A coupling core,
conductor means connecting the individual cores to each other in a loop,
the polarity of the conductor means windings on the cores being such that an output signal is not attained when an input A pulse is supplied to the input A winding and an input B pulse is supplied to the B winding,
means coupled to all the cores to selectively hold and reset the flux patterns of the cores in a four phase time cycle to control the directivity of information flow.

6. A magnetic core circuit capable of performing the logical $\bar{A}\cdot\bar{B}$ function comprising an input A and an input B coupling magnetic cores having two stable magnetic states, said input cores having substantially the same physical dimensions, an output coupling magnetic core having two stable magnetic states, first, second and third load cores each having two stable magnetic states, said second load core having substantially the same physical dimensions as the input A coupling core, low resistance conductor means of equal conductivity in both directions connecting the individual cores to each other in a loop, the polarity of the conductor means windings on the cores being such that an output signal is obtained only when input signals A and B are absent, and means coupled to all the cores to selectively hold stored flux patterns at desired levels and to reset the magnetic states thereof in a four phase time cycle control the directivity of information flow.

7. A magnetic core circuit capable of performing the logical $A\cdot B$ function comprising an input A and an input B coupling magnetic cores having two stable magnetic states, said input cores having substantially the same physical dimensions, an output coupling magnetic core having two stable magnetic states, first, second and third load cores each having two stable magnetic states, said second load core having substantially the same physical dimensions as the input A coupling core, low resistance conductor means of equal conductivity in both directions connecting the individual cores to each other in a loop, the polarity of the conductor means windings on the cores being such that an output signal is obtained only when input signals A and B are present, and means coupled to all the cores to selectively hold stored flux patterns at desired levels and to reset the magnetic states thereof in a four phase time cycle control the directivity of information flow.

8. A magnetic core circuit capable of performing logical operations comprising an input A and an input B coupling magnetic cores having two stable magnetic states, said input cores having substantially the same physical dimensions, an output coupling magnetic core having two stable magnetic states, first, second and third load cores each having two stable magnetic states, said second load core having substantially the same physical dimensions as the input A coupling core, low resistance conductor means of equal conductivity in both directions connecting the individual cores to each other in a loop, the polarity of the conductor means windings on the cores being such that the voltage induced in the conductor means by the switching of the magnetic state of a core are opposed by voltages induced into the conductor means by the simultaneous switching of the magnetic state of another core, and means coupled to all the cores to selectively hold stored flux patterns at desired levels and reset the magnetic states thereof in a four phase time cycle control the directivity of information flow.

References Cited by the Examiner

UNITED STATES PATENTS

| | | | |
|---|---|---|---|
| 3,070,706 | 12/1962 | Block | 307—88 |
| 3,090,036 | 5/1963 | Kauffmann | 307—88 |
| 3,157,794 | 11/1964 | Kahn | 307—88 |
| 3,163,771 | 12/1964 | Paulsen | 307—88 |
| 3,174,049 | 3/1965 | Paulsen | 307—88 |
| 3,181,001 | 4/1965 | Brewster | 307—88 |

BERNARD KONICK, *Primary Examiner.*

IRVING SRAGOW, *Examiner.*

M. S. GITTES, R. J. McCLOSKEY, *Assistant Examiners.*